(12) United States Patent
Wagner

(10) Patent No.: US 9,885,630 B2
(45) Date of Patent: Feb. 6, 2018

(54) METHOD AND DEVICE FOR ANALYZING A LIGHT EMISSION OF A HEADLIGHT OF A VEHICLE

(71) Applicant: Robert Bosch GmbH, Stuttgart (DE)

(72) Inventor: Marcus Wagner, Lauffen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 67 days.

(21) Appl. No.: 14/619,999

(22) Filed: Feb. 11, 2015

(65) Prior Publication Data

US 2015/0241301 A1    Aug. 27, 2015

(30) Foreign Application Priority Data

Feb. 27, 2014 (DE) ........................ 10 2014 203 544

(51) Int. Cl.
| | |
|---|---|
| G01J 1/00 | (2006.01) |
| G01M 11/00 | (2006.01) |
| G01J 9/00 | (2006.01) |
| G01M 11/06 | (2006.01) |

(52) U.S. Cl.
CPC .............. *G01M 11/00* (2013.01); *G01J 9/00* (2013.01); *G01M 11/064* (2013.01)

(58) Field of Classification Search
CPC ........ G01J 1/4257; G01J 9/00; G01M 11/061; G01M 11/064; G01M 11/06

USPC ......................................................... 356/121
See application file for complete search history.

(56) References Cited

U.S. PATENT DOCUMENTS

| | | | | |
|---|---|---|---|---|
| 2009/0043458 A1* | 2/2009 | Kamioka | ............... | B60Q 1/085 701/49 |
| 2011/0231151 A1* | 9/2011 | Takahashi | ............. | G01S 7/4808 702/159 |
| 2012/0158254 A1* | 6/2012 | Takagaki | ............... | B60Q 1/085 701/49 |
| 2013/0058116 A1* | 3/2013 | Galbas | ................... | B60Q 1/085 362/512 |
| 2014/0219506 A1* | 8/2014 | Foltin | ................ | G06K 9/00825 382/104 |
| 2015/0324972 A1* | 11/2015 | Hayakawa | ............. | H04N 7/183 348/148 |

\* cited by examiner

*Primary Examiner* — Tarifur Chowdhury
*Assistant Examiner* — Md M Rahman
(74) *Attorney, Agent, or Firm* — Norton Rose Fulbright US LLP; Gerard Messina

(57) ABSTRACT

A method for analyzing a light emission of a headlight of a vehicle includes: a step of reading in a distance which represents a distance between the vehicle and an object situated in the surroundings of the vehicle; a step of reading in an illumination value which represents a height of an area of the object which is illuminated by the light emission; and a step of determining a light emission value which characterizes the light emission, using the distance value and the illumination value.

12 Claims, 4 Drawing Sheets

METHOD AND DEVICE FOR ANALYZING A LIGHT EMISSION OF A HEADLIGHT OF A VEHICLE

BACKGROUND OF THE INVENTION

1. Field of the Invention

The present invention relates to a method for analyzing a light emission of a headlight of a vehicle, a corresponding device, and a corresponding computer program product.

2. Description of the Related Art

Blinding of other road users may be avoided when a light emission of a headlight of a vehicle is correctly adjusted. There is presently no option for adjusting the setting of the beam height of a headlight except in a repair shop. Such light control may be carried out in a repair shop with the aid of specialized light testing equipment. Such equipment for controlling the headlights may be situated in front of a headlight, with the headlight switched on, in order to analyze the light emission of the headlight.

BRIEF SUMMARY OF THE INVENTION

Against this background, using the approach presented here, a method for analyzing a light emission of a headlight of a vehicle, a device which uses this method, and lastly, a corresponding computer program product, are provided.

An object which is situated in the surroundings of a vehicle may advantageously be used for analyzing a light emission of a headlight of the vehicle.

Such a method for analyzing a light emission of a headlight of a vehicle includes the following steps:

reading in a distance value which represents a distance between the vehicle and an object situated in the surroundings of the vehicle;

reading in an illumination value which represents a height of an area of the object which is illuminated by the light emission; and determining a light emission value which characterizes the light emission, using the distance value and the illumination value.

The vehicle may be a passenger vehicle, a truck, or some other vehicle, for example. The headlight may be a front headlight of the vehicle. The light emission may correspond to a light cone which is emitted by the headlight when in operation. The object may be a traffic sign or an infrastructure element such as a lane boundary post of a roadway. A dimension of the object, in particular a height of the object, may be known. The object may be situated in the area ahead of the vehicle. In particular, the object may be situated in an area that is covered by the light emission, i.e., in an area that is illuminated by the headlight. The distance value may represent a distance between the object and a reference point of the vehicle. The distance value may indicate the distance in meters, for example. The illumination value may indicate the height of the illuminated area from the ground in centimeters, for example. The illumination value and the distance value, for example, may be correlated with one another in the step of determining in order to determine the light emission value. The light emission value may also be determined, for example, using a predetermined determination rule which includes the illumination value and the distance value as parameters. The light emission value may be output via an interface. The light emission value may be used, for example, to compare an instantaneous light emission of the headlight to a setpoint light emission of the headlight, or to adapt the light emission of the headlight to the setpoint light emission.

The method may include a step of reading in a motion value. The motion value may represent an acceleration or speed of the vehicle. The step of determining may be carried out as a function of the motion value. For example, it is possible to carry out the step of determining only when a uniform motion of the vehicle may be deduced from the motion value. The situation may thus be avoided that the analysis of the light emission is distorted by a pitching motion of the vehicle which is caused by an acceleration.

The method may include a step of reading in a pitch value. The pitch value may represent a pitching motion of the vehicle. The step of determining may be carried out using the pitch value. The analysis of the light emission may thus be carried out even during a nonuniform motion, for example during an acceleration of the vehicle.

The distance value may be read in via an interface with a surroundings detection unit of the vehicle in the step of reading in the distance value. The surroundings detection unit may be designed for recognizing objects situated in the detection range of the surroundings detection unit and for determining a distance from these objects. Similarly, the illumination value may be read in via an interface with an object recognition unit of the vehicle in the step of reading in the illumination value. The object recognition unit may be designed for evaluating a depiction of the surroundings and in particular a depiction of the object, and for carrying out a classification of the object. A known height of the object, for example, may be associated with the object as a result of the classification. In addition, the object recognition unit may be designed for recognizing the illuminated area of the object and for ascertaining the dimension, in particular the height, of the illuminated area, for example using a recognized dimension of the illuminated area, a recognized dimension of the object, and a known dimension of the object which is associated with the object. Values ascertained by known units of a vehicle may thus be further used for analyzing the light emission.

For example, the method may include a step of ascertaining the distance value based on a radar-based distance measurement. The distance may be determined very accurately by a radar-based distance measurement. Alternatively, a distance measurement based on LIDAR or ultrasound or a stereo video measurement, for example, may be carried out.

The method may include a step of ascertaining the illumination value based on a video-based object recognition and on a predetermined dimension of the object which is associated with the object. The object may be recognized very accurately by a video-based object recognition, for example using a camera of the vehicle. This simplifies an association of the predetermined dimension with the object.

For example, the light emission value may be determined as a maximum illumination range of the light emission in the step of determining the light emission value. The maximum illumination range may be determined very easily from the distance value and the illumination value, using a known installation height of the headlight.

In addition, the light emission value may be determined as a height of the light emission which is associated with a distance in the step of determining the light emission value. The light emission value may thus indicate the particular height of the light emission at a certain distance from the headlight. A check may thus be made, for example, as to whether the light emission does not exceed a predefined maximum height at a predefined distance.

The method may include a step of comparing the light emission value to a predetermined setpoint light emission value associated with a setpoint light emission. The setpoint light emission may correspond, for example, to a light emission according to the rules. The instantaneous light emission of the headlight may be easily checked by such a comparison. For example, an emission characteristic of the headlight which influences the light emission may be adapted as a function of a comparison result which results from the comparison.

According to one specific embodiment, the method may include a step of adjusting a beam height of the light emission, using the light emission value. This allows the vehicle itself to adjust and/or correct the beam height, using the processed information.

The steps of the method may be carried out multiple times in repetition. For example, the method may include at least one further step of reading in a further distance value which represents a distance between the vehicle and a further object situated in the surroundings of the vehicle, at least one further step of reading in a further illumination value which represents a height of an area of the further object which is illuminated by the light emission, and at least one further step of determining a further light emission value which characterizes the light emission, using the further distance value and the further illumination value. In this way, use may be made not only of a single event, such as a post, but also of multiple events to verify the computations for analyzing the light emission and avoiding misadjustments with regard to the light emission.

For this purpose, the method may include, for example, a step of filtering and/or averaging the light emission values in order to determine a light emission value which is based on at least two light emission values. Such a combined light emission value which is based on multiple individual light emission values may be further processed or used instead of an individual light emission value. The accuracy of the method may be increased in this way. Thus, for example, the results of multiple computations may be averaged or filtered, so that an adjustment of the light emission does not take place with each event, but, rather, takes place only gradually and in such a way that the driver does not notice it.

A device for analyzing a light emission of a headlight of a vehicle includes the following features:
  a reader for reading in a distance value which represents a distance between the vehicle and an object situated in the surroundings of the vehicle;
  a reader for reading in an illumination value which represents a height of an area of the object which is illuminated by the light emission; and
  a determination unit for determining a light emission value which characterizes the light emission, using the distance value and the illumination value.

The approach presented here thus also provides a device which is designed for carrying out or implementing the steps of one variant of a method provided here in appropriate units. The object underlying the present invention may also be quickly and efficiently achieved by this embodiment variant of the present invention in the form of a device.

In the present context, a device may be understood to mean an electrical device which processes sensor signals and outputs control and/or data signals as a function thereof. The device may include an interface which may have a hardware and/or software design. In a hardware design, the interfaces may be part of a so-called system ASIC, for example, which contains various functions of the device. However, it is also possible for the interfaces to be dedicated integrated circuits, or to be at least partially composed of discrete components. In a software design, the interfaces may be software modules which are present on a microcontroller, for example, in addition to other software modules.

Also advantageous is a computer program product or computer program including program code which may be stored on a machine-readable carrier or storage medium such as a semiconductor memory, a hard disk, or an optical memory, and used for carrying out and/or controlling the steps of the method according to one of the above-described specific embodiments, in particular when the program product is executed on a computer or a device.

The approach presented here is explained in greater detail below as an example, with reference to the appended drawings.

DETAILED DESCRIPTION OF THE INVENTION

Figure 1:
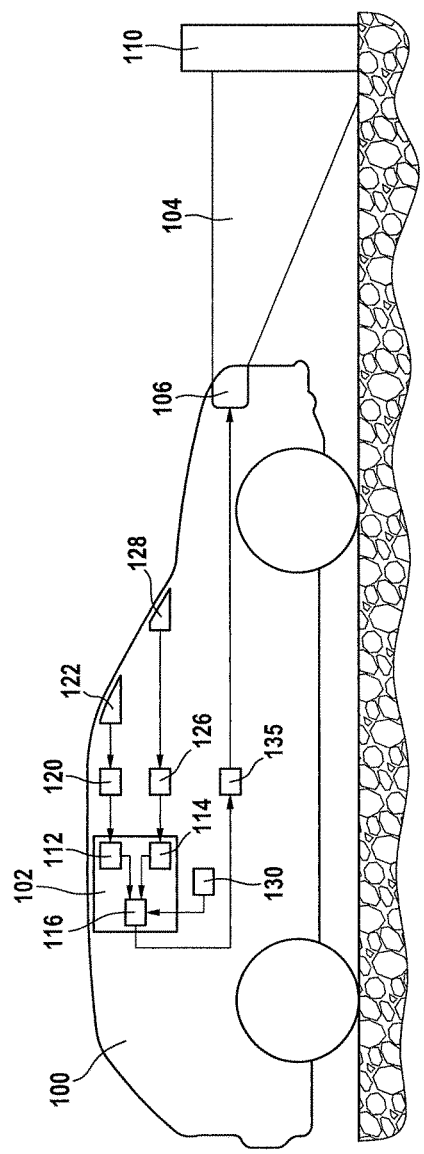
FIG. 1 shows a schematic illustration of a vehicle which includes a device for analyzing a light emission of a headlight of the vehicle according to one exemplary embodiment of the present invention.

In the following description of advantageous exemplary embodiments of the present invention, identical or similar reference numerals are used for the elements having a similar action which are illustrated in the various figures, and a repeated description of these elements is dispensed with.

FIG. 1 shows a schematic illustration of a vehicle 100 which includes a device 102 for analyzing a light emission 104 of a headlight 106 of vehicle 100 according to one exemplary embodiment of the present invention.

Device 102 is designed for receiving a distance value which represents a distance between vehicle 100 and an object 110 situated in the surroundings of vehicle 100. For this purpose, device 102 includes a reader 112 for reading in the distance value.

Device 102 is also designed for receiving an illumination value which represents a height of an area of the object which is illuminated by the light emission. For this purpose, device 102 includes a reader 114 for reading in the illumination value.

Device 102 is also designed for determining a light emission value which characterizes light emission 104. For this purpose, device 102 includes a determination unit 116 for determining the light emission value. Determination unit 116 is designed for determining the light emission value, using the distance value and the illumination value.

Device 102 is designed for providing the light emission value at an interface. The light emission value may define, for example, an illumination range of headlight 106, i.e., a maximum illumination range of light emission 104, for example. In addition, the light emission value may represent a value which is determined from a combination of the distance value and the illumination value. Such a light emission value may define, for example, a beam angle of light emission 104 or a height of the light emission at a certain distance from headlight 106.

According to one exemplary embodiment, vehicle 100 includes a surroundings detection unit 120. Surroundings detection unit 120 is designed for ascertaining the distance value and providing it to device 102. For this purpose, surroundings detection unit 120 may be designed for evaluating a sensor signal of a surroundings sensor 122, such as a radar system which includes a radar sensor for the distance measurement.

According to one exemplary embodiment, vehicle 100 includes an object recognition unit 126. Object recognition unit 126 is designed for ascertaining the distance value and providing it to device 102. For this purpose, object recognition unit 126 may be designed for evaluating a further sensor signal of a further surroundings sensor 128, such as a video system which includes a video camera, for detecting the surroundings of vehicle 100.

According to one exemplary embodiment, device 102 includes an optional interface for reading in a motion value which represents, for example, an acceleration or change in speed of vehicle 100 which is detected by an acceleration sensor 130. In this case, device 102 may be designed, for example, for blocking a determination or output of the light emission value as a function of the motion value, for example when an acceleration indicated by the motion value exceeds a threshold value.

According to one exemplary embodiment, device 102 includes an optional interface for reading in a pitch value which represents a pitching motion of the vehicle. The pitch value may likewise be provided by acceleration sensor 130, for example. The pitch value may be entered into the determination of the light emission value as a correction value, for example, in order to compensate for a change in light emission 104 caused by the pitching motion.

According to one exemplary embodiment, an optional adjustment unit 135 is provided which is designed for ascertaining a control signal for adjusting a characteristic of light emission 104, using the light emission value, and using it for adjusting headlight 106. To ascertain, for example, whether a correction of an adjustment of headlight 106 is necessary, adjustment unit 135 may be designed, for example, for comparing the light emission value to a stored setpoint light emission value.

Figure 2A:
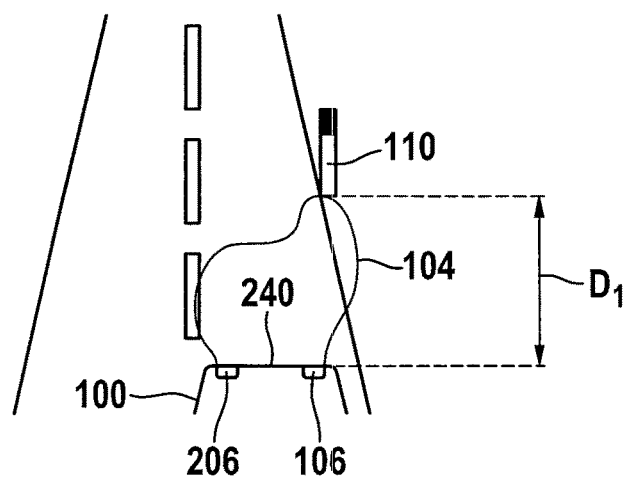
FIGS. 2a through 2c show schematic illustrations of a vehicle and an object according to one exemplary embodiment of the present invention.
Figure 2B:
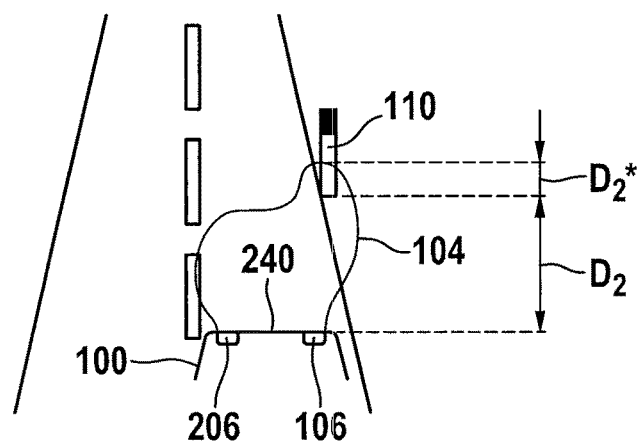
Figure 2C:
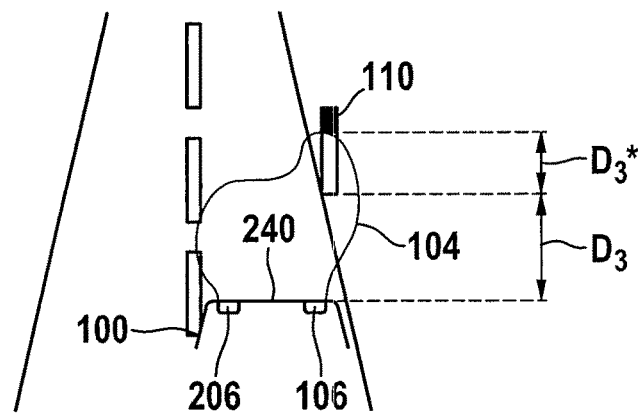

FIGS. 2a through 2c show schematic illustrations of a vehicle 100 and an object 110 according to one exemplary embodiment of the present invention. Object 110 is a roadway marker, for example, which is situated as a guide post at the edge of a roadway. Vehicle 100 is traveling in the right lane of the roadway, and is moving toward object 110. Vehicle 100 may be the vehicle which is described with reference to FIG. 1, which includes a device for analyzing a light emission 104.

Light emission 104 of vehicle 100 is produced in the form of a light cone by two headlights 106, 206 situated at a front edge 240 of vehicle 100. An area ahead of vehicle 100 is illuminated by light emission 104. According to this exemplary embodiment, vehicle 100 is designed as a passenger vehicle, and is shown in a top view in FIGS. 2a through 2c.

Instead of a guide post, other standardized markers such as a roadway sign may be used as object 110. According to this exemplary embodiment, object 110 has a standardized height. Object 110, which otherwise has a bright color, has a dark, for example black, area in an upper section. A height of the dark area may likewise be standardized.

In FIG. 2a, object 110 has not yet been covered by light emission 104. There is a distance $D_1$ between object 110 and front edge 240 of vehicle 100. According to this exemplary embodiment, distance $D_1$ characterizes a maximum illumination range of light emission 104.

In FIG. 2b, object 110 is covered partially, for example in the lower third or up to one-half, by light emission 104. There is a distance $D_2$ between object 110 and front edge 240 of vehicle 100. A height $D_2^*$ of the area of object 110 covered by light emission 104 is marked in FIG. 2b.

The area covered by light emission 104 thus appears bright, and may therefore be recognized by an object recognition unit of vehicle 100. In addition, the object recognition unit may be designed for ascertaining height $D_2^*$ of the covered area of object 110 and providing it as an illumination value, for example.

Distance $D_2$ may be ascertained, for example, using a surroundings detection unit 120 of vehicle 100, and provided as the distance value.

In FIG. 2c, object 110 is covered partially, for example in the lower two thirds, by light emission 104. According to this exemplary embodiment, object 110 is illuminated by headlights 106, 206 up to the height of the beginning of the dark upper section of object 110.

There is a distance $D_3$ between object 110 and front edge 240 of vehicle 100. A height $D_3^*$ of the area of object 110 covered by light emission 104 is marked in FIG. 2c.

One exemplary embodiment of the present invention is described in greater detail below with reference to FIGS. 2a through 2c.

According to the exemplary embodiment, the data from a video system which includes image recognition and a radar system are used together and compared to one another.

A roadway from the viewpoint of a driver or the video system is apparent in FIGS. 2a through 2c. The roadway is viewed over front edge 240 of the hood, and roadway markers 110 and light 104 from headlights 106, 206 are apparent. In FIG. 2a, guide post 110 is not yet in light 104 of the headlights. Post 110 is increasingly illuminated little by little, i.e., upon passing by. Object recognition software of the video system is designed for recognizing post 110 and determining the height ($D_1^*$, $D_2^*$, $D_3^*$) of post 110, since post 110 is standardized. These are denoted as heights $H_1$, $H_2$, $H_3$ in FIGS. 3a through 3d.

According to one exemplary embodiment, the distance from other objects 110, such as stop signs or yield signs, may likewise be utilized. Distances ($D_1$, $D_2$, $D_3$) at the particular points in time are determined from the radar system, as described with reference to FIGS. 3a through 3d.

It may thus be computed whether the correct illumination range of headlights 106, 206, and in particular of headlight 106 situated on the side of object 110, is set.

The safety of the occupants of host vehicle 100 and also of the traffic traveling ahead and oncoming traffic may by increased using the described approach. Adjusting the beam height to correct values avoids blinding of other road users, and ensures the visual range in the host vehicle when traveling in darkness. According to one exemplary embodiment, the light intensity of light emission 104 may be monitored, and a warning signal may optionally be output to warn the driver.

Figure 3A:
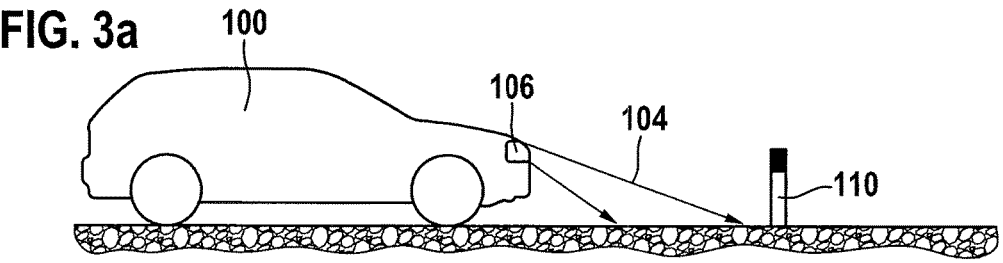
FIGS. 3a through 3d show schematic illustrations of a vehicle and an object according to one exemplary embodiment of the present invention.
Figure 3B:
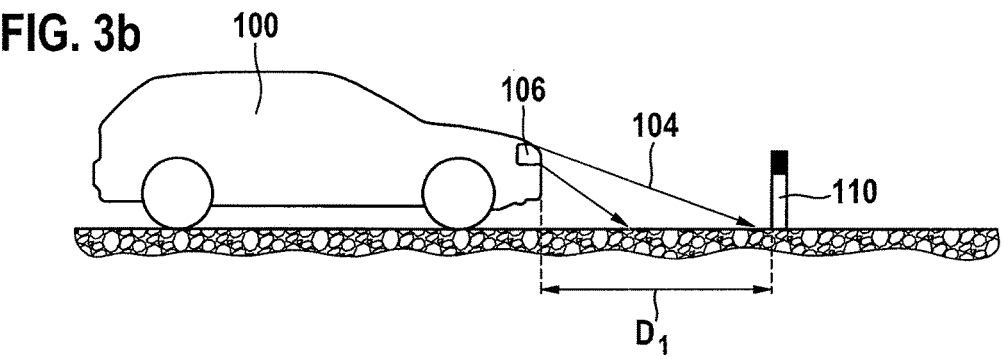
Figure 3C:
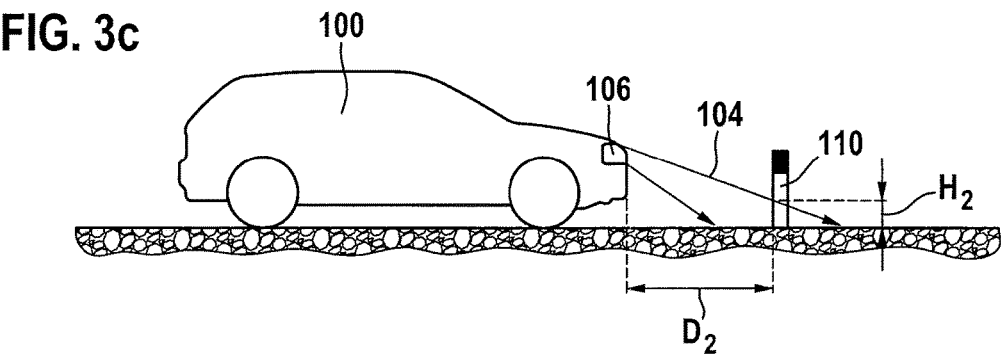
Figure 3D:
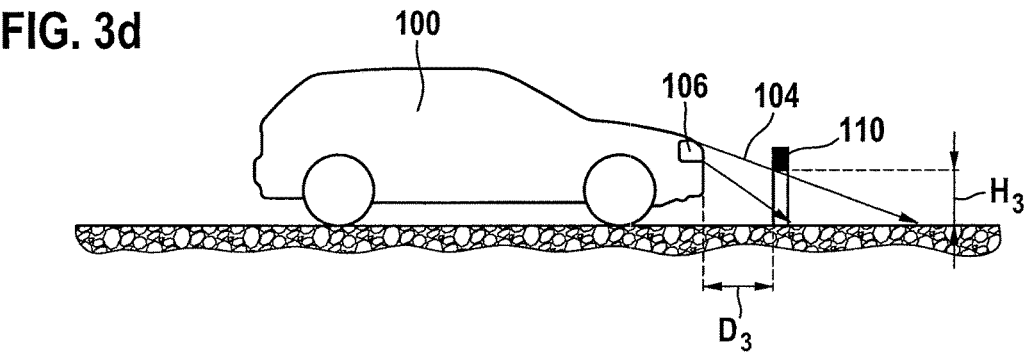

FIGS. 3a through 3d show schematic illustrations of a vehicle 100 and an object 110 according to one exemplary embodiment of the present invention. Vehicle 100 and object 110 are illustrated from the side. FIGS. 3b through 3d show vehicle 100 in the situations shown in FIGS. 2a through 2c. In FIG. 3a, vehicle 100 is shown at an earlier point in time, at which light emission 104 of headlight 106 of vehicle 100 ends in front of object 110.

Thus, the same time periods are illustrated in FIGS. 3b through 3d as in FIGS. 2a through 2c, with vehicle 100 shown from the side. It is apparent that the light from light emission 104 moves with vehicle 100 from left to right, and the light from light emission 104 covers guide post 110 upon passing by.

FIG. 3a shows vehicle 100 at a point in time t=0 at which light 104 is still at a distance from post 110.

FIG. 3b shows vehicle 100 at a point in time t=1 at which the lower edge of post 110, i.e., the ground, is reached.

FIG. 3c shows vehicle 100 at a point in time t=2 at which the middle of post 110 is reached. Vehicle 100 is situated at a distance $D_2$ from object 110, and object 110 is illuminated up to a height $H_2$.

FIG. 3d shows vehicle 100 at a point in time t=3 at which the portion or section of post 110, colored black here, is illuminated. Vehicle 100 is situated at a distance $D_3$ from object 110, and object 110 is illuminated up to a height $H_3$.

FIGS. 3a through 3d thus show a schematic illustration and parameters which may be used for distance recognition of relevant objects according to one exemplary embodiment of the present invention.

According to one exemplary embodiment, by evaluating the speed and the acceleration of vehicle 100, for example with data from the ESP control unit or the navigation device of vehicle 100, it is also ensured that vehicle 100 travels uniformly; for example, acceleration a of the vehicle is equal to 0 or approximately equal to 0, and an adjustment may be allowed, i.e., for example, for carrying out the steps of a method for analyzing light emission 104.

According to one exemplary embodiment, the adjustment is always to be allowed, but in this case the adjustment software is designed for also taking the pitch of vehicle 100 during acceleration and braking into account.

Thus, according to one exemplary embodiment, a device and a method are provided for adjusting the beam height of light emission 104 while vehicle 100 is traveling, and for adjusting the longitudinal acceleration of vehicle 100.

Figure 4:
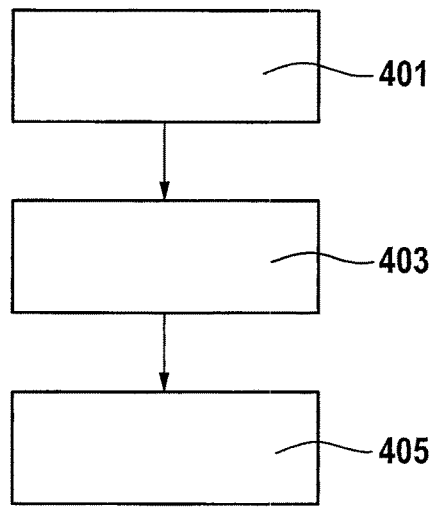
FIG. 4 shows a flow chart of a method according to one exemplary embodiment of the present invention.

FIG. 4 shows a flow chart of a method for analyzing a light emission of a headlight of a vehicle according to one exemplary embodiment of the present invention. The steps of the method may be implemented, for example, in conjunction with units of the vehicle shown in FIG. 1.

A distance value which represents a distance between the vehicle and an object situated in the surroundings of the vehicle is read in a step 401. Similarly, an illumination value which represents a height of an area of the object illuminated by the light emission is read in a step 403. A light emission value which characterizes the light emission is determined in a step 405, using the distance value and the illumination value.

Steps 401, 403, 405 may be carried out in repetition to be able to utilize multiple objects, situated in the surroundings of the vehicle, for determining a light emission value. For example, posts which are covered in chronological succession by the light emission of the headlight may be utilized for this purpose.

Figure 5:
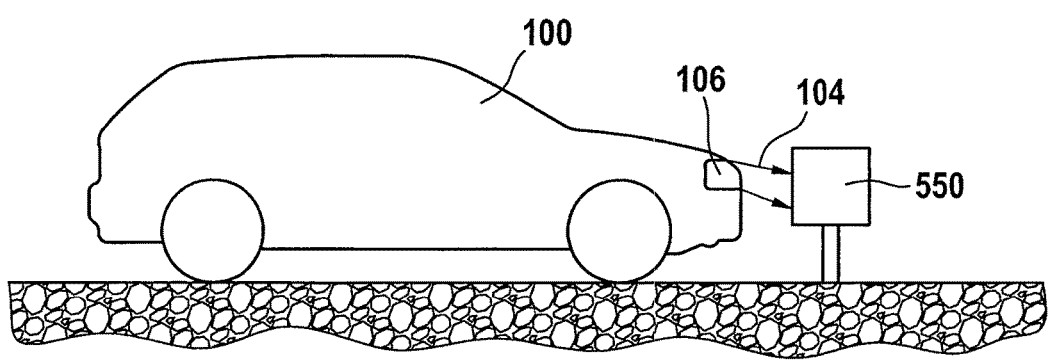
FIG. 5 shows a light control of a headlight of a vehicle, using a light testing device.

FIG. 5 shows a light control of a headlight 106 of a vehicle 100, using a specialized light testing device 550 in a repair shop. Such a control may be carried out, for example, in addition to the analysis of the light emission of headlight 106 described with reference to the preceding figures, or may be replaced by such an analysis.

Due to the described analysis, in which the beam height or range may be adjusted for a motor vehicle while vehicle 100 is traveling, it is no longer necessary that for each occurrence a repair shop has to be visited which has such equipment 550 for controlling headlights 106.

The exemplary embodiments which are described, and shown in the figures, have been selected only as examples. Different exemplary embodiments may be combined with one another, either completely or with respect to individual features. In addition, one exemplary embodiment may be supplemented by features of another exemplary embodiment.

Furthermore, the method steps provided here may be repeated, and carried out in a sequence different from that described.

If an exemplary embodiment includes an "and/or" link between a first feature and a second feature, this may be construed in such a way that according to one specific embodiment, the exemplary embodiment has the first feature as well as the second feature, and according to another specific embodiment, the exemplary embodiment either has only the first feature or only the second feature.

What is claimed is:

1. A method for analyzing a light emission of a headlight of a vehicle, comprising:
   reading in, by an electrical device of the vehicle, a distance value which represents a distance between the vehicle and an object situated in the surroundings of the vehicle;
   reading in, by the electrical device of the vehicle, an illumination value which represents a height of an illumination area of the object which is illuminated by the light emission;
   reading in, by the electrical device of the vehicle, a motion value which represents one of an acceleration or speed of the vehicle;
   determining, by the electrical device of the vehicle, a light emission value which characterizes the light emission of the headlight, using the distance value, the motion value, and the illumination value; and
   adjusting, by the vehicle, a beam height of the light emission, using the light emission value, thereby adapting the light emission of the headlight to a setpoint light emission value.

2. The method as recited in claim 1, further comprising:
   reading in a pitch value which represents a pitching motion of the vehicle and wherein the light emission value is determined taking into account the pitch value.

3. The method as recited in claim 2, wherein at least one of (i) the distance value is read in by a surroundings detection unit of the vehicle in the step of reading in the distance value, and (ii) the illumination value is read in by an object recognition unit of the vehicle in the step of reading in the illumination value.

4. The method as recited in claim 2, further comprising:
   ascertaining the distance value based on a radar-based distance measurement.

5. The method as recited in claim 2, further comprising:
   ascertaining the illumination value based on (i) a video-based object recognition and (ii) a predetermined dimension of the object which is associated with the object.

6. The method as recited in claim 2, wherein the light emission value is determined as a maximum illumination range of the light emission in the step of determining the light emission value.

7. The method as recited in claim 2, wherein the light emission value is determined as a height of the light emission which is associated with a distance in the step of determining the light emission value.

8. The method as recited in claim 1, further comprising:
comparing the light emission value to the setpoint light emission value associated with a setpoint light emission in order to check the light emission of the headlight, wherein the setpoint light emission value corresponds to a predefined maximum height at a predefined distance.

9. The method as recited in claim 8, further comprising:
reading in a further distance value which represents a distance between the vehicle and a further object situated in the surroundings of the vehicle;
reading in a further illumination value which represents a height of an illumination area of the further object which is illuminated by the light emission; and
determining a further light emission value which characterizes the light emission, using the further distance value and the further illumination value.

10. The method as recited in claim 9, further comprising:
at least one of filtering and averaging the two light emission values in order to determine a resulting light emission value which is based on the two light emission values.

11. A device for analyzing a light emission of a headlight of a vehicle, comprising:
a first reader for reading in a distance value which represents a distance between the vehicle and an object situated in the surroundings of the vehicle;
a second reader for reading in an illumination value which represents a height of an illumination area of the object which is illuminated by the light emission;
a third reader for reading in a motion value which represents one of an acceleration or speed of the vehicle; and
a determination unit for determining a light emission value which characterizes the light emission of the headlight, using the distance value, the motion value, and the illumination value,
wherein the vehicle adjusts a beam height of the light emission, using the light emission value, thereby adapting the light emission of the headlight to a setpoint light emission value.

12. A non-transitory, computer-readable data storage medium storing a computer program having program codes which, when executed on a computer, perform a method for analyzing a light emission of a headlight of a vehicle, the method comprising:
reading in, by an electronic device of the vehicle, a distance value which represents a distance between the vehicle and an object situated in the surroundings of the vehicle;
reading in, by the electronic device of the vehicle, an illumination value which represents a height of an illumination area of the object which is illuminated by the light emission;
reading in, by the electronic device of the vehicle, a motion value which represents one of an acceleration or speed of the vehicle;
determining, by the electronic device of the vehicle, a light emission value which characterizes the light emission of the headlight, using the distance value, the motion value, and the illumination value; and
adjusting, by the vehicle, a beam height of the light emission, using the light emission value, thereby adapting the light emission of the headlight to a setpoint light emission value.

* * * * *